(Model.)

4 Sheets—Sheet 1.

G. W. AMESBURY.
Machine for Sharpening Band Saws.

No. 243,424.  Patented June 28, 1881.

WITNESSES:

INVENTOR

George W. Amesbury,
By Connolly Bros,
ATTORNEYS

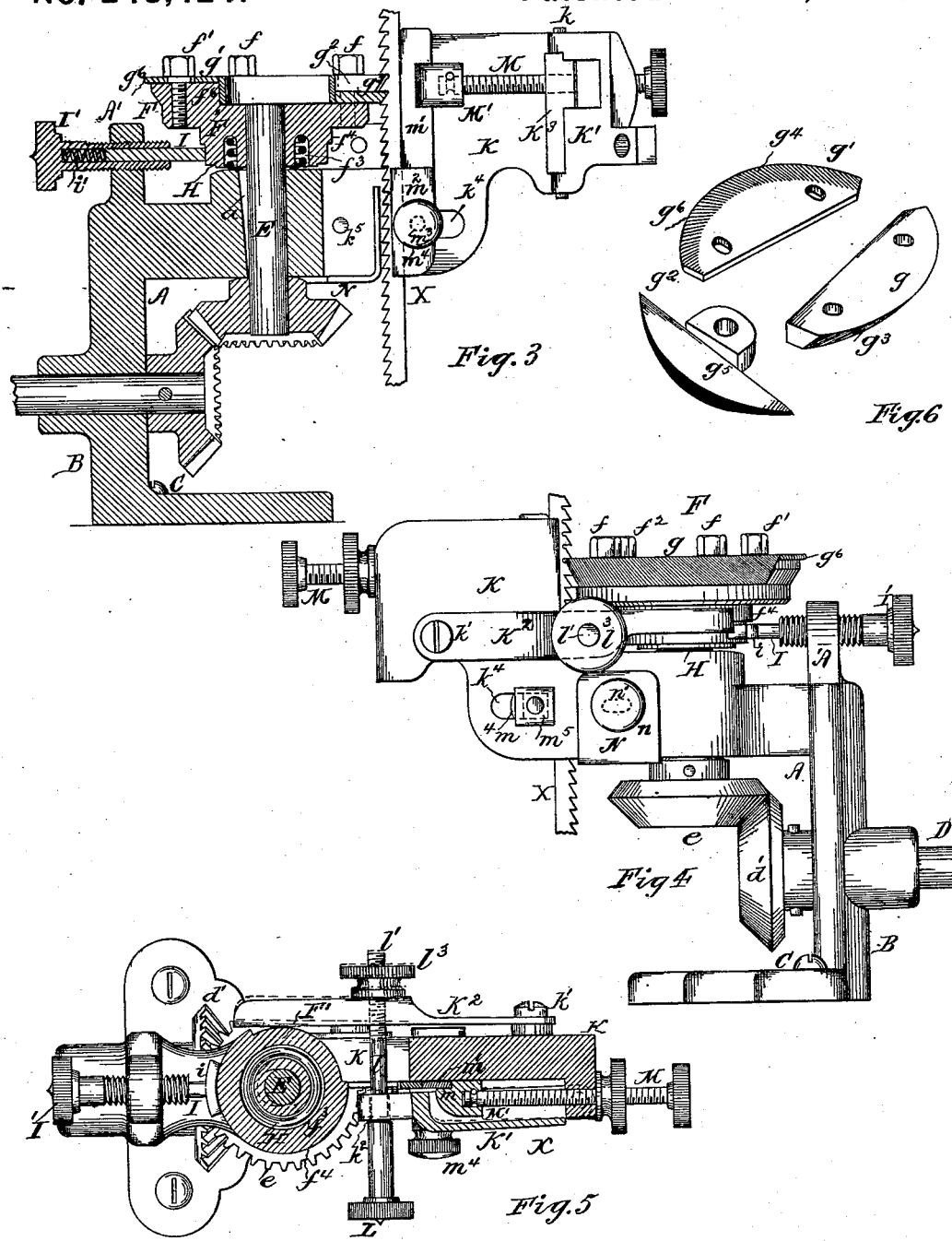

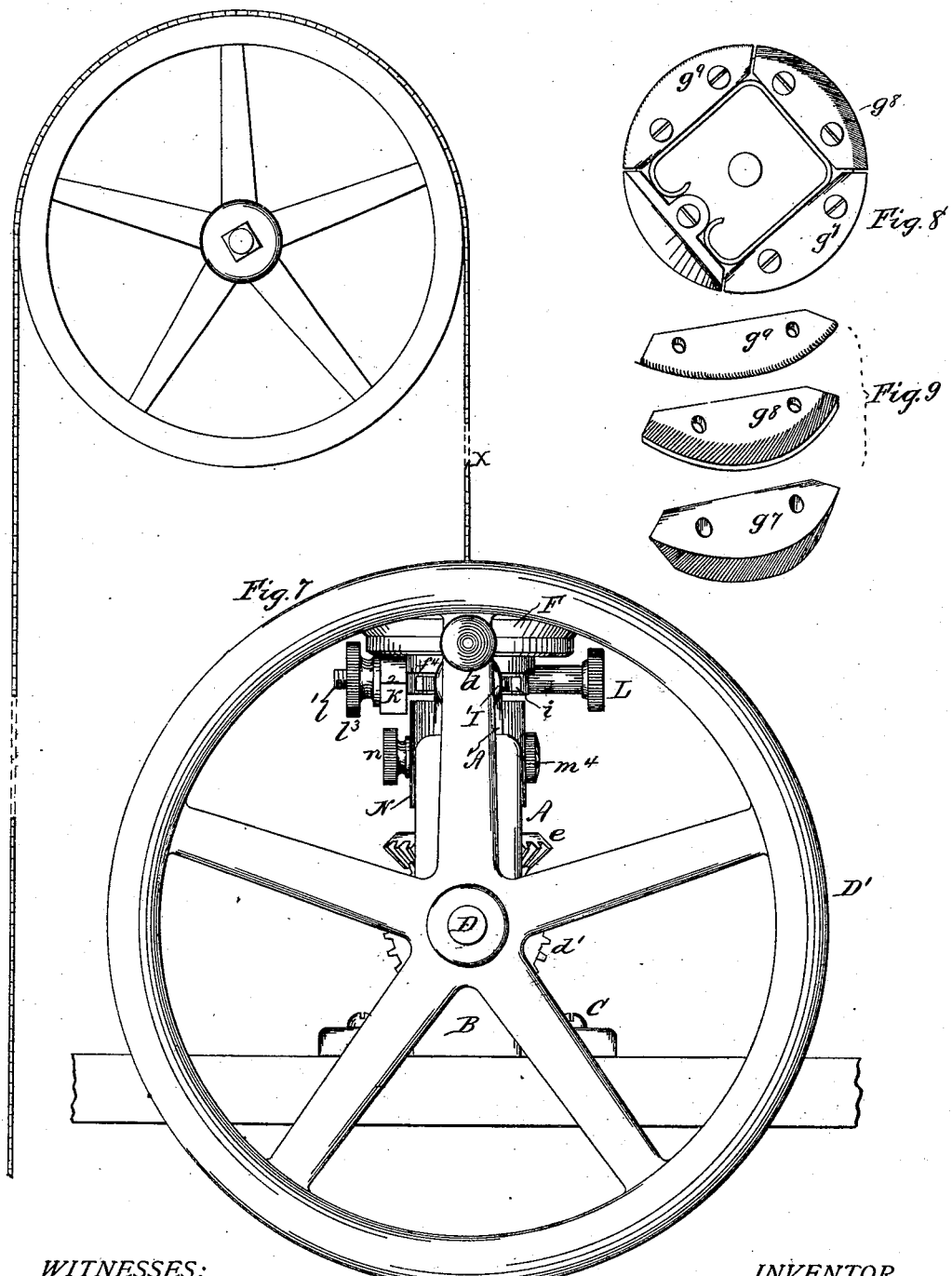

(Model.)
4 Sheets—Sheet 4.
G. W. AMESBURY.
Machine for Sharpening Band Saws.
No. 243,424. Patented June 28, 1881.
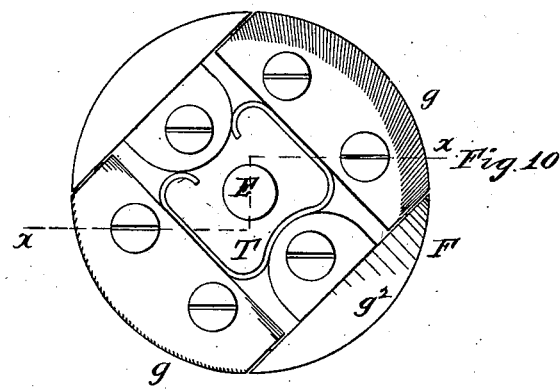
Fig. 10
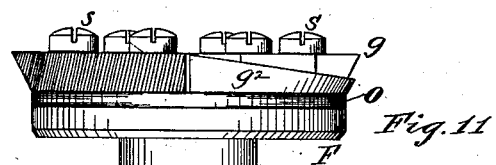
Fig. 11
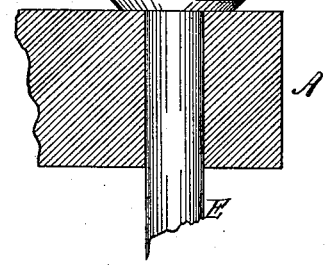
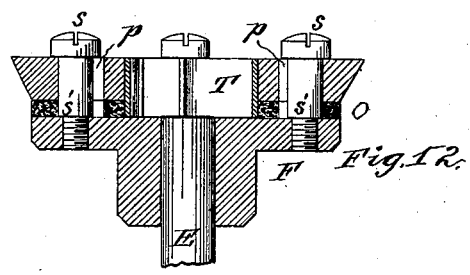
Fig. 12.
WITNESSES:
S. J. VanStavoren
J. B. Connelly
INVENTOR
George W. Amesbury,
By Connelly Bros,
ATTORNEYS

UNITED STATES PATENT OFFICE.

GEORGE W. AMESBURY, OF PHILADELPHIA, PENNSYLVANIA.

MACHINE FOR SHARPENING BAND-SAWS.

SPECIFICATION forming part of Letters Patent No. 243,424, dated June 28, 1881.

Application filed December 13, 1880. (Model.)

*To all whom it may concern:*

Be it known that I, GEORGE W. AMESBURY, a citizen of the United States, residing in the city of Philadelphia, in the county of Philadelphia and State of Pennsylvania, have invented certain new and useful Improvements in Machines for Sharpening Band-Saws, of which the following is a specification, reference being had to the accompanying drawings, wherein—

Figure 1:
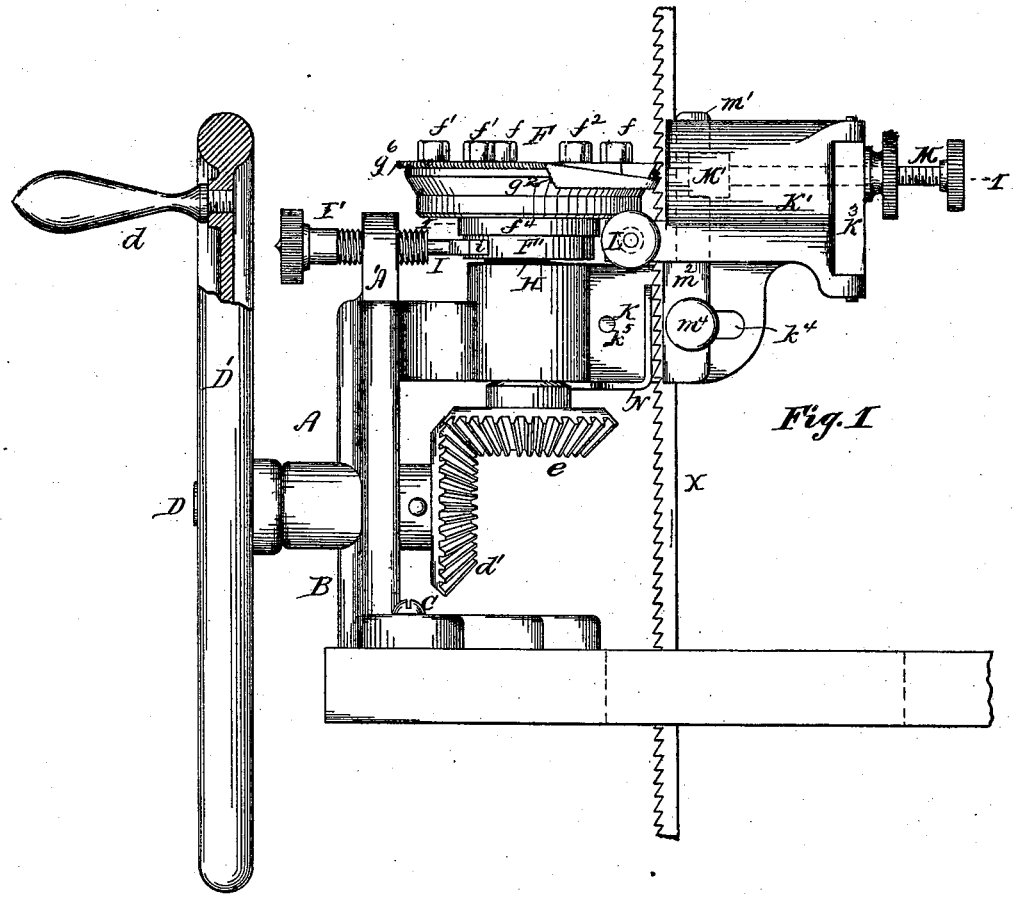
Figure 2:
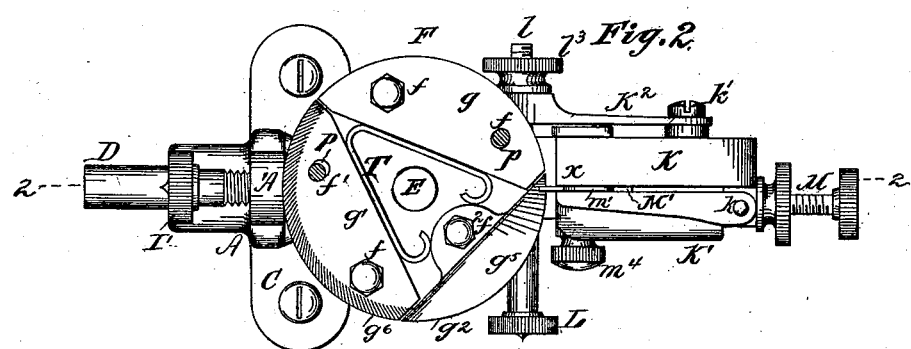

Figure 1 is a side elevation of a saw-sharpening machine embodying my improvements, the driving-wheel being partly in section. Fig. 2 is a plan of the same with the driving-wheel removed. Fig. 3 is a section on line 2 2, Fig. 2, showing in elevation the hinged clamping-gate thrown back. Fig. 4 is a side elevation, the reverse of that shown in Fig. 1. Fig. 5 is a section on the line 1 1, Fig. 1. Fig. 6 shows detail perspectives of the saw-sharpening files and of the feeder. Fig. 7 is a front elevation of my machine, represented as applied to a bench or saw-table, the band-saw being in position for sharpening. Fig. 8 is a plan of a modified form of arrangement of the saw-sharpeners and the feeding device. Fig. 9 shows detail perspectives of said sharpeners. Fig. 10 is a plan of another modification of the saw-sharpeners and feeding devices. Fig. 11 is an elevation of the same, and Fig. 12 is a vertical transverse section on the line $x$ $x$, Fig. 10.

My invention has for its object to provide a machine for sharpening and gumming saws; and my improvements consist in the peculiar construction and combination of parts, hereinafter fully set forth, having reference principally to the following points: First, to the provision of rotary segmental files having unlike abrading faces, one file being designed and adapted to sharpen the faces and the other the backs of the teeth and the throat; second, to the combination, with the rotary segmental files, of a feeding device mounted on the same shaft or revolving head with said files, said feeding device consisting of a beveled segment whose feeding-face is a straight incline; third, to a gage so constructed as to permit saws having different sizes of teeth to be sharpened and gummed on the same machine, and to allow the said saws to be inclined, while being sharpened and gummed, according to any desired pitch of tooth; fourth, to an automatic clamp of peculiar construction for holding the saw tightly while being sharpened, and freeing it while being fed; fifth, to means for allowing the files to yield while operating upon the saw, so as to avoid obstruction, by reason of inequality of the file or imperfections in the saw-blade, and at the same time to secure action of all the file-teeth upon each tooth of the saw by keeping the file during its entire operation pressed up and in against the teeth of the saw upon which it is acting; sixth, to a guard for preventing wabbling or swinging of the pendent part of the saw while being sharpened.

Referring to the accompanying drawings, A indicates the frame of the machine, which may be mounted upon a base, B, provided with a clamp, C, whereby it may be secured to a bench or table, or attached directly to a saw-frame.

D is a driving-shaft carrying a hand-wheel or pulley, D', to which power is communicated in any suitable manner, as by a handle, $d$, or a driving-belt. Said shaft carries a bevel-wheel, $d'$, which meshes with another like wheel, $e$, on the lower end of a vertical shaft, E, which carries at its upper end a file and feeder-head, F. Said shaft has its bearings in the frame A, which bearings may consist of a circular opening or of a slot, $a$, as hereinafter set forth. The head F carries two segmental files $g$ and $g'$, and a segmental feeder, $g^2$, said files and feeder being fastened in position by screws $f f' f^2$. Said files and feeder have their outer faces or peripheries inclined, as shown. The file $g$ has its periphery serrated to form its working-face $g^3$, while the toothed portion of the file $g'$ is its upper face, $g^4$. A shoulder or elevation, $f^6$, may be formed on the head F to afford a seat for this file $g'$. The upper faces of both files are horizontal, while the upper face of the feeder is a straight incline, $g^5$. The corner or edge, $g^6$, of the file $g'$ is also serrated, so as to form a file for gumming or cutting away the throats of the saw-teeth or the interdental spaces. The head F is formed or secured to a hub, F', having an annular recess or socket, $f^3$, which receives a spiral spring, H, that rests upon the frame A, as shown. The object of this spring is to exert an upward pressure on the head F, for a purpose hereinafter fully explained.

I represents a bar formed with a yoke, $i$, which embraces or presses against the hub $F'$. The opposite end of this bar fits snugly in a threaded thimble, $I'$, which has a screw bearing in an upright, $A'$, on the frame A. Within this thimble is a spiral spring, $i'$, which bears against the end of the bar I, tending thus to press the head F over toward the saw, so as to keep the files and feeder in due contact therewith, the slotted bearing for the shaft E permitting a vibrating motion of said shaft and head toward and from said saw, the spring $i'$ yielding under the conditions hereinafter set forth.

K represents a fixed projection of the frame A, to which is secured a swinging gate, $K'$, whose pivot is shown at $k$. These two parts form a clamp for the saw. (Shown at X.) To cause the clamp to operate automatically, so as to bind the saw while the files are operating upon it, and to free it while the feeder is moving it, I provide the following arrangement:

$K^2$ is a spring secured, by a screw, $k'$, to the rigid projection K. Its opposite end bears against a cam, $f^4$, on the hub $F'$.

L is a bolt having a smooth shank, $l$, and a threaded end, $l'$. The smooth shank passes through a plain opening, $k^2$, in the gate $K'$, while the screw end $l'$ enters a threaded opening in the spring $K^2$. Hence, when the cam $f^4$ presses the spring $K^2$ out into the position indicated by dotted lines in Fig. 5, the gate $K'$ is drawn toward the rigid projection K, and the saw is firmly clamped between them, this being done while the files are operating on the teeth of said saw. When, on the contrary, the cam $f^4$ and spring $K^2$ are in the positions indicated in full lines in said figure, the gate $K'$ is no longer tightly clamped upon the saw, and the latter is then free to be moved by the feeder which, at this time, advances said saw. To secure the bolt L a jam-nut, $l^3$, is fitted on its threaded end.

M represents a screw passing through a threaded opening in a shoulder or offset, $K^3$, on the fixed projection K. Said screw is swiveled in a block, $M'$, which fits and has liberty of motion between the said projection K and the gate $K'$. Said block is rabbeted at $m$ to receive the edge of a spring-plate, $m'$, against which the back of the saw rests. Said plate is bowed or sprung so as to present laterally a sufficient bearing-surface for any thickness of saw and be at the same time capable of compression to within the thickness of the saw when the latter is bound between the clamping-jaw $K'$ and projection K.

To the lower end of the spring-plate $m'$ is riveted a supplemental plate, $m^2$, which extends outwardly so as to lap over the side of the saw, as plainly shown in Fig. 1. In this plate $m^2$ is an opening, $m^3$, in line with a slot, $k^4$, in the projection K. Through said opening and slot passes a set-screw, $m^4$, to a sliding nut, $m^5$, which fits in the opening $k^4$. By this arrangement the gage-plate $m'$ may be set vertically or at any desired inclination conformable to the pitch of the teeth of the saw.

N represents a plate secured to the projection K by a set-screw, $n$, which passes through a slot, $n'$, in said plate, and enters a threaded opening, $k^5$, in said projection. The purpose of this device is to prevent wabbling or vibration of the pendent portion of a band-saw while the part above is being sharpened.

The operation is as follows: The gate $K'$ is first opened to permit the insertion of the saw between it and projection K. Said gate is then closed and the bolt L inserted and made fast in position. The gage $m'$ and guide N are then duly adjusted to the saw. Motion being communicated to the shaft D the head F is caused to revolve, carrying with it in its revolution the files $g\ g'$ and feeder $g^2$. These in their revolution pass successively between the teeth of the saw, the file $g$ sharpening the back of the tooth and the file $g'$ the face of said tooth and gumming the throat, the feeder $g^2$ operating to advance the saw the distance of one tooth at each revolution of the head F. The springs $i'$ and H tend to keep the files pressed constantly to their work, so that every portion of said files operates effectively on each tooth, and at the same time they will yield to the required degree without inflicting any injury upon themselves whenever any obstruction, such as an unduly raised tooth on the files, or a hard impediment in the saw blade, is met with. As the file $g$ operates only on the back of the tooth, while the file $g'$ acts only on the face and throat, and as said files work successively and not simultaneously, there is a division of labor, which reduces the strain and permits the work of sharpening to be effected with less exertion and power than would be required if the face and back of the tooth were both sharpening synchronously. At the same time one tooth of the saw (or the face of one and back and throat of another tooth) is completely sharpened and gummed at each revolution of the head F.

I have so far described but two segmental files, one for the back of the tooth, the other for the face and throat; but in practice I should prefer three files, as shown in Figs. 8 and 9—one, $g^7$, for the back, another, $g^8$, for the face, and the third, $g^9$, for the throat, of the tooth. The advantage of this construction is this: The corners of a file are the first to wear out; hence, where both the corners and sides are used, a file whose sides are still good has to be thrown away as soon as its corners wear off, but by using separate files for the different parts of the saw-teeth, those having teeth on the sides may be retained after that which has its teeth on the corner or edge is worn out; hence the files $g^7$ and $g^8$ will outlast three or four of the edge or corner files, $g^9$, while the latter may be replaced as often as required at very slight expense, its cost being inconsiderable.

By having the gumming-file separate from the sharpening-files a better clearance and more throat room can be secured than by means of a file which both sharpens and gums, as such separate gumming-file can be caused to cut as deeply as desired without being limited in its motion by the other files, hence securing improvement in the action of the saw and requiring less frequent sharpening than is otherwise necessary.

Instead of locating a spring, H, between the head F and the frame A, a spring, O, of rubber or other resilient material may be placed between said head and the files and feeder, the effect being to keep the latter pressed up against the face of the saw-tooth while permitting them to yield in the exigency already suggested. So, too, instead of permitting the shaft D to have play-space in a slotted bearing, $a$, the files and feeder may have slotted openings $p$ $p$ $p$ for the passage of their retaining-screws $s f$, and be kept pressed outwardly by a spring, T. In this case said retaining-screws should be formed with shoulders $s'$, which are screwed down to meet the head F, so as to avoid binding the files and feeder so tightly as to prevent action thereon of the spring T.

By employing feeders having different degrees of inclination, saws of unlike grades of teeth may be operated upon in one machine. In practice two such feeders are all that will be usually required, as one feeder may be caused to feed different grades of saws, the incline of the feeder coming into contact at its lowest point with the face of a coarse tooth at the moment of entering the interdental space, while with a finer tooth the incline does not come into contact until about the middle portion of such tooth is reached.

The invention herein described is particularly designed and adapted for filing band-saws; but it is also applicable to sharpening and gumming saws of other kinds, so that I do not limit my claim to any particular kind of saw on which said invention may be employed.

What I claim as my invention is as follows:

1. In a saw-sharpener, two or more rotary segmental files, $g$ $g'$, serrated, respectively, on different faces or sides, whereby the backs and faces of the saw-teeth will be sharpened successively and not simultaneously, substantially as and for the purpose set forth.

2. In combination with a rotary head, F, segmental files $g$ $g'$, serrated, respectively, on different sides or faces, and a feeder, $g^2$, consisting of a straight incline, $g^5$, said feeder operating to advance the saw after the segmental files have operated thereon successively, substantially as and for the purpose set forth.

3. In combination with the file-head F and shaft E, the slotted bearing $a$, pressure-bar I, spring $i'$, and screw-thimble I', substantially as shown and described.

4. In combination with a rotary file-head, F, and frame or support A, the spiral spring H, operating to press said head upwardly and permitting it to yield downwardly, substantially as and for the purpose set forth.

5. In combination with the rotary head F, having cam-hub F', the spring $K^2$, bearing against said cam, the swinging gate K', rigid projection K, and bolt L, whereby the saw is clamped while being filed, and freed while being fed, substantially as shown and described.

6. In combination with the rigid projection K and swinging gate K', the gage-plate $m'$, consisting of a bowed spring constructed and designed for operation, substantially as shown and described.

7. In combination with the gage-plate $m'$, the set-screw M and block M' for moving said plate toward and from the back of the saw, substantially as shown and described.

8. In combination with the gage-plate $m'$, the slotted supplementary plate $m^2$, set-screw $m^4$, nut $m^5$, and projection K, slotted at $k^4$, substantially as shown and described.

9. In a saw-sharpener constructed and adapted to file a saw while the latter is in vertical position, in combination with the frame A, the guide N, for preventing wabbling or swinging of the pendent part of a saw in sharpening, and a gage-plate constructed and arranged to impinge against the back of the saw, substantially as shown and described.

10. In a machine for sharpening band-saws, two segmental files—one a thin file with teeth on its edge or periphery, and on its upper or flat face, and designed to sharpen the face of a saw-tooth, and the other a thick file with teeth cut on its beveled face only, and designed to sharpen the back of a saw-tooth—said files not cutting both at the same time, but alternating in their action, substantially as set forth.

11. The combination, in a saw-sharpener, of two rotary segmental files having teeth serrated, respectively, on different faces or sides, and a feeding device for moving the saw after a tooth has been acted upon by said files successively, substantially as shown and described.

In testimony that I claim the foregoing I I have hereunto set my hand this 9th day of December, 1880.

GEORGE W. AMESBURY.

Witnesses:
CHAS. F. VAN HORN,
SAML. J. VAN STAVOREN.